L. WILLETT.
RUNNER ATTACHMENT FOR HARROWS.
APPLICATION FILED FEB. 3, 1920.
1,353,007.
Patented Sept. 14, 1920.
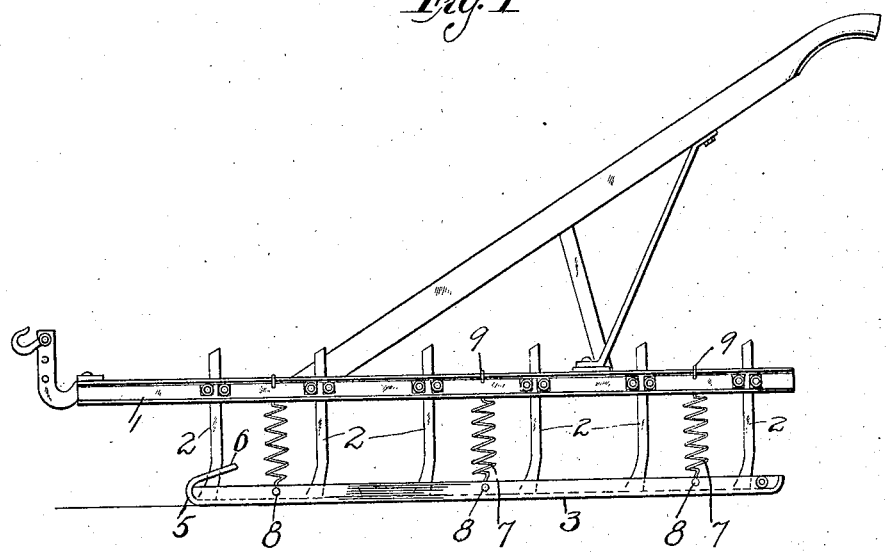
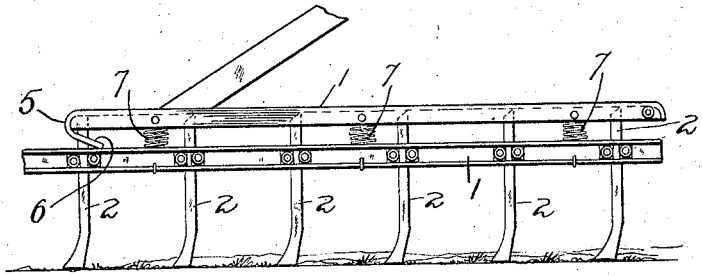
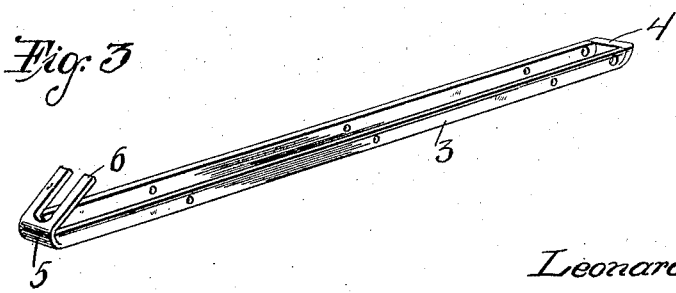
Inventor
Leonard Willett
By Franklin H. Hough
Attorney

UNITED STATES PATENT OFFICE.

LEONARD WILLETT, OF PADUCAH, KENTUCKY.

RUNNER ATTACHMENT FOR HARROWS.

1,353,007.        Specification of Letters Patent.     Patented Sept. 14, 1920.

Application filed February 3, 1920. Serial No. 356,017.

*To all whom it may concern:*

Be it known that I, LEONARD WILLETT, a citizen of the United States, residing at Paducah, in the county of McCracken and State of Kentucky, have invented certain new and useful Improvements in Runner Attachments for Harrows; and I do hereby declare the following to be a full, clear, and exact description of the invention, such as will enable others skilled in the art to which it appertains to make and use the same, reference being had to the accompanying drawings, and to the letters and figures of reference marked thereon which form a part of this specification.

This invention relates to a novel construction of runner or sled attachment for harrows or tooth cultivators.

The object is to provide a harrow or cultivator attachment of the nature specified, which may be quickly attached to the cultivator or harrow so as to enable the same to pass over a field or meadow without damaging it in the least and so as, also, to enable the harrow or cultivator to traverse a gravel road or a road passing through a woods without damage to the cultivator teeth.

The runner attachment also, when the harrow is not in use, serves as a protection to the harrow when being transported from one place to another on the farm; and also acts as a guard when the harrow is passing around a stump. The runner attachment also acts as a protection to the horse or mule in the event of the animal stepping back upon the harrow.

The invention is clearly shown in the accompanying drawings, in which:

Figure 1 is a side elevation of a harrow with my sled attachment shown in operative position beneath the lower ends of the harrow teeth.

Fig. 2 is a fragmentary view in side elevation of a harrow, showing my sled attachment in reversed position, that is to say, as occupying a position on top of the harrow teeth, and Fig. 3 is a detail view in perspective of one of the runners.

Referring now in detail to the drawings: 1 designates one of the side bars of the harrow which is of usual construction, and forms no part of my invention. The side bar supports the usual harrow teeth 2 which project at their upper ends above the side bar, as clearly shown in the drawing.

My invention comprises two runners or sled attachments, one of which is shown in the drawings, it being understood that the runner on the opposite side of the harrow is of identical construction.

Each sled attachment comprises a steel channel 3, the channel being closed, as shown at 4 and 5, and being provided at its front end with a forked flange 6 extending upward and rearward in an inclined direction. As shown in Fig. 1, the forked extension or flange 6 straddles the front tooth 2 and thus assists in preventing sidewise movement of the runner with respect to the teeth.

Suitable yielding means are provided for holding each runner firmly against the harrow teeth and in this instance I have shown a plurality of springs 7 which are suitably connected at one end, as shown at 8, to the runner 3, and at their opposite ends detachably secured to the side bar 1, as shown at 9.

In operation, when it is desired to drag the harrow over a gravel road, or the like, the runner is positioned as shown in Fig. 1 beneath the harrow teeth, the springs 7 holding the runners firmly up against the harrow teeth. Upon arriving at a field to be harrowed, the runner is reversed and disposed in the position shown in Fig. 2, where it is seen that the runner is disposed bottom upward upon the tops of the harrow teeth 2, and is held in such position by the springs 7 engaging the bottom of the side bar 1. In this position, the attachment or runner acts as a guard when the harrow is passed around a stump, so it is obvious that the runner protects the tops of the harrow teeth 2 against injury. The runner in this position also acts as a protection to the animal drawing the harrow, in the event that the animal steps back upon the harrow.

What I claim to be new is:

1. A sled attachment for harrows or the like, comprising a channel bar provided at one end with a forked flange adapted to straddle the front tooth of the harrow, and means for yieldingly holding said sled attachment beneath the lower ends of the harrow teeth, or in reverse position upon the tops of said teeth.

2. A sled attachment for harrows or the like, comprising a channel bar provided at one end with a forked flange adapted to straddle the front tooth of the harrow, springs for yieldingly holding said sled attachment beneath the lower ends of the harrow teeth, or in reverse position upon the tops of said teeth.

In testimony whereof I hereunto affix my signature.

LEONARD WILLETT.